United States Patent Office 2,795,556
Patented June 11, 1957

2,795,556

COMPOSITION PROVIDING AVAILABLE CHLORINE AND PROCESS OF MAKING SAME

John A. Quinn, Jersey City, N. J., assignor to
The Theobald Industries

No Drawing. Application July 26, 1954,
Serial No. 445,908

3 Claims. (Cl. 252—187)

This invention relates to a chlorinated dialkylhydantoin composition, the process of making it and, more particularly a composition including stabilized and solubilized dichloro- or other chlorinated dimethylhydantoin in partially dechlorinated condition.

The composition meets a long existing need for a stable but effective dry material for household or other laundry bleaching operations, removal of stain or discoloration from fabrics, and sanitizing and disinfecting operations.

The process is one which produces a dried composition of minimized deterioration and decreased loss of chlorine during storage and in which the ratio of chlorine to nitrogen is somewhat reduced as compared to the ratio in the original hydantoin compound used.

I attribute the stabilizing feature of my invention to two factors. I remove chlorine during the processing, in one embodiment of the invention, from certain isomers or forms of the chlorinated hydantoin compound which are relatively unstable. In a second embodiment, I dispose a mildly alkaline barrier, constituting an acid receptor, between the minutely dispersed chlorinated compound, as by spray drying an aqueous slurry containing the normally unstable chlorinated hydantoin compound, an antacid buffer salt, and also solubilizing material to increase the solubility of the hydantoin compound in water.

Whatever the exact explanation of the mechanism of the improvement may be, I make a product which has good shelf life, remains free flowing even in paper packages under conditions of high atmospheric temperature and relative humidity, is at least as effective in bleaching goods such as soiled fabrics in laundry operations, and ordinarily more effective per unit of chlorine content than the composition containing the more labile chlorine, and shows increased water solubility of the hydantoin compound.

Briefly stated, my invention comprises a stabilized hydantoin compound selected from the group consisting of dichlorodimethylhydantoin and other chlorinated alkyl-hydantoins, in combination with (1) a hydrotrope for the said hydantoin compound and water and (2) an antacid buffer salt. The invention comprises, for solubility increasing function, the inclusion of a surface-active agent in addition to the hydrotrope.

The invention comprises also the herein described process which includes forming an aqueous slurry of the several components, dispersing the slurry in the form of fine particles or spray in a stream of hot gas and maintaining contact of the dispersed particles and the hot gas until the hydantoin compound used is partially dechlorinated and the whole is reduced to the form of solid particles in which the several compounds are co-solidified in intimately blended form approaching or being actually a solid solution and the hydantoin compound is thus spaced from itself by intervening masses of the other solid components present. I have found that this process gives particularly good results when the particles of the slurry are never allowed to reach a temperature above 212° F., contact with the hot gas is maintained until the remaining water content of the particles falls to within the approximate range 8%–13%, and the resulting dried beads or fine granules are then separated from the gas stream.

The gaseous or aeriform stream into which the aqueous composition is atomized is hot, so that there is quick surface drying and crusting over of the fine particles of the atomized composition. The subsequent drying then causes escape or diffusion of moisture through this initially formed crust and gives the desired relatively uniform drying of the minute beads of product and also removal of excessively labile chlorine.

Dichlorodimethylhydantoin is the material which I use in preparing my commercial bleaching and sanitizing composition. It is one of the materials sometimes referred to herein as "the hydantoin compound." It is generally assigned the following structural formula and name:

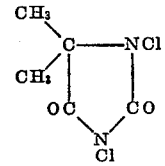

1,3-dichloro-5,5-dimethylhydantoin

This compound has approximately 72% available chlorine by calculation, this figure in the accepted sense here adopted being twice the percentage of actual chlorine by weight. The commercial product, as, for instance, Halane, contains a smaller amount of available chlorine such as 66%–68%. A part of this chlorine, I find, is labile under my processing conditions. I remove that most labile part, about 5%–20% and ordinarily about a tenth of the chlorine originally present in Halane. This produces a new material in which the ratio of chlorine to nitrogen is lower than that of the original material. In one example of my invention I adjusted the Cl:N ratio to 2.31:1 whereas the original ratio was 2.54:1. Simultaneously I reduced the total percentage of nitrogen by 3%–4% of that originally present. This removal gives a finished composition characterized by moderated but effective action of the available chlorine at the time of use and by increased storage stability.

In place of the dichloro compound described, I may use other chlorinated dimethylhydantoin, such as the product made by passing chlorine through an aqueous suspension of 5,5-dimethylhydantoin in water in contact with such a proportion of sodium carbonate as to form hypochlorite, in accordance with usual technique, the introduction of chlorine and the attendant chlorination being continued until the chlorine content comes to be in excess of that required to form the monochloro derivative and suitably until the chlorination is substantially complete. The chlorinated product so made is then separated centrifugally from the aqueous mixture in which the product is only very slightly soluble. The chlorinated dimethylhydantoin so made may be substituted pound for pound for the dichloro compound in the examples of this invention.

In place of the chlorinated dimethylhydantoin, the corresponding 5-methyl-5-ethyl, 5-methyl-5-isobutyl, or other 5,5-di-lower-alkyl compounds in chlorinated form may be used. When lower solubility of the chlorinated product is acceptable for a given end use of the composition, I may use a 5,5 monoalkyl monoaryl substituted dichlorohydantoin, for example, monomethyl monophenyl dichlorohydantoin.

The hydrotropic agent used is one that is effective with water and the selected hydantoin compound, non-toxic, non-offensive in odor and, in the proportion used, non-coloring of fabrics which may later be bleached with the final composition although the agent itself in concentrated form may have a slight color. The agent is a mutual solvent or dispersing agent for water and the hydantoin compound which alone has limited water solubility. Examples of hydrotropic agents that meet these requirements and illustrate the class that I use are sodium toluene sulfonate; a di-lower-alkyl ester of naphthalene sulfonic acid in the form of its sodium salt, an example of which is the sodium salt of dibutyl naphthalene sulfonic acid known as Leonil SA; any one of the said aryl sulfonic acids esters condensed with formaldehyde to form a methylene bridge as in the sodium salt of methylene bis(naphthalene sulfonic acid) such as Blancol; and the sodium salt of a monoalkyl aryl sulfonic acid ester as, for example, sodium isopropyl naphthalene sulfonate known as Aerosol OS. In place of the sodium salts described I may use the corresponding potassium or the magnesium salts although I have so far found no advantage of them over the less expensive sodium compounds.

The antacid buffer salt used is ordinarily also a bead strengthening agent and is a salt that when tested alone in water in concentration 0.25% gives a pH of approximately 9–11 and, when in contact with the hydantoin compound effectively buffers the composition within the pH range 6–10 and suitably within the range 7.8–8.6. Examples of salts that meet these requirements and that I use are the phosphates such as sodium tripoly-, tetrasodium pyro, and sodium hexametaphosphate. Sodium dihydrogen phosphate may be used in addition and in concentration to establish the pH at the desired level without sacrifice of the mechanical strength of the bead. Generally I have found that the phosphates which hydrate to a considerable degree are the most satisfactory buffers for my purpose. For this reason I ordinarily select a phosphate buffer salt that hydrates but does not lose finally all of the water of hydration under my conditions of processing. As the buffer salt, I may use also borax, sodium sesquicarbonate, the corresponding potassium salts, or mixtures of two or more of the salts described.

A surface-active agent is added to advantage for its effect in combination with the hydrotrope in increasing the solubility of the hydantoin compound. This surfactant is any one of those that is conventional in laundry cleansing compositions provided it is selected to be resistant to the action of the hydantoin compound. Examples of such surface-active agents are sodium or potassium alkylaryl sulfonates, alkyl sulfates, alkyl sulfonates (MP 189) and the sulfonated neutralized reaction product of an acid chloride of tallow with methyl taurine (Igepon TE-42). An example of the alkyl sulfates that I may use is Duponol D or Sipex S. In case the surface-active agent is the same in composition as the hydrotrope, the surface-active agent is used in amount in excess of the hydrotropic proportion.

I may incorporate chemically inert materials also in my slurry before the heat rearrangement and spray drying as, for instance, filler or builder salts such as sodium or potassium sulfate or chloride and other usual ingredients of laundry cleansing or bleaching compositions.

In one embodiment of the invention, an optical bleach or brightener is incorporated. The optical bleach used is one of the known class of additives for laundry cleansing composition that is resistant to chemical action of the hydantoin compounds and, when applied to a fabric and then exposed to light, particularly the ultraviolet portion of the spectrum or daylight, emit a white to blue-white light. Examples of such optical bleaches that I mix with the slurry to be processed and spray dried in my invention are those known by the trade name Calcofluor 4B or 5B and Tinopal RBS or GS. Examples are 9-phenyl anthracene; 3,7-bis (acrylamino) dibenzothiopene-5,5-dioxide derivative (Calcofluor); di-benzothiophene dioxide acylated with acetic or maleic anhydride or butyryl; sulfonated diaminobenzothiophene sulfone acylated with phenyl isocyanate or the like; and 3-hydroxy 6-methoxy fluorane.

The optical bleach to be used by me may be one that is resistant to the action of hypochlorus acid. When so resistant, it will resist also action of hypochlorites and the available chlorine yielding compound or compounds of the hydantoin compound. The optical bleaches named above meet this requirement and illustrate classes of materials that I use.

However, I have found that certain other classes of optical brighteners as, for example, Hiltamine Arctic White N and Calcofluor LD (alkyl dialkylamino coumarin) that are not ordinarily resistant to available chlorine as in hypochlorites or hypochlorus acid are satisfactory in the available chlorine yielding composition of my invention. Calcofluor 4B in combination with the White N is very effective and produces on the finished fabric, particularly cotton, in a single treatment, a grade of whiteness of such psychophysical proportions as to be a new development and one that is highly desirable. Hiltamine Arctic White N is dimethyl aminomethyl coumarin.

I have found that I can combine two shades of optical bleaches neither of which is a pure blue, but the two of which complement each other so as to give in combination practically pure blue whiteness when exposed to light.

Also I have found that I can make an optical bleach that is non-substantive to cotton or like fabric become in effect substantive to the selected fabric by including in the composition another optical bleach that is originally substantive. Thus, Calcofluor 4B which is substantive to cotton will fix on cotton Hiltamine Arctic White N. I explain this effect as being due to the retention on the cotton fiber of the originally substantive compound and the effect of this compound in anchoring or fixing or rendering substantive the other bleach. The result is not only increased substantivity but also a greatly improved shade of whiteness of emitted light because of the complementary shades of blue in the two original bleaches. In this particular test, there were used 3 parts of Calcofluor 4B to 1 part of Hiltamine Arctic White N. In another example, aesculin (non-substantive) is used with any of the substantive brighteners.

I have also found that optical bleaches applied in my whole composition are somewhat more effective per unit of weight of the optical bleach than ordinarily is the case. This I consider to be due to the increased substantivity when the combination of optical bleaches is used or to the better distribution of the optical bleach over the surface of the fiber when the bleach is applied in contact with the other components of my composition.

As to the effect of the hydrotrope, an experiment will illustrate the effectiveness of my composition in promoting the solubilization of partially dechlorinated dichloromethylhydantoin and thus facilitating the production of a concentrated aqueous solution containing available chlorine:

3 gms. of that portion of the commercial product Halane that collected on a 60 mesh sieve were dispersed with mechanical agitation in 500 ml. of tap water at 84° F. for 3 minutes. Then the material that remained undissolved was settled for 2 minutes. A 100 ml. portion of the clear supernatant solution was then carefully pipetted off. The percentage of available chlorine in the clear solution was determined by titration and found to be 800 p. p. m. which corresponds to 1210 p. p. m. of the Halane.

The above procedure was repeated exactly but with a 35% solution of the hydrotrope sodium toluene sulfonate substituted for water. The clear solution now contained 1530 p. p. m. available chlorine which corresponded to 2230 parts of Halane. The solubility of Halane had therefore been nearly doubled by the hydrotrope.

As to proportions, I use such amounts of the materials to be slurried as to give finished beads containing the various components in about the following proportions for 100 parts of the whole composition on the dry basis: 5–20 parts of the hydantoin compound; 2–10 of the hydrotropic agent; 20–40 of the phosphate or other antacid buffer and bead strengthening salt; and 2–35 parts of the surfactant. The inert or builder salt, when used, may replace the buffer salt to the extent of about half or less of the said 20–40 parts. When the optical bleach is used it is in the proportion of about 0.05–0.2 part. The proportions here and elsewhere herein are expressed as parts by weight for 100 of the finished product derived from the slurry or aqueous composition to be dried.

The process of the invention is in general as follows:

Sodium toluene sulfonate or other selected hydrotropic agent or mixtures of them is dissolved in water to form a concentrated solution, as for instance, 20–50 parts of the agent in 100 parts of water. Then dichlorodimethylhydantoin as, for example Halane, is stirred into this solution to form a slurry. A large part of the Halane remains undissolved.

There is formed separately a solution of granular sodium tripolyphosphate or other selected buffer against acidity, as in the proportion of 1 part of the buffer to 1.2 of water. When the phosphate is the buffer used, its hydration raises the temperature to about 100°–110° F., the phosphate passes into solution, and is reprecipitated in finely divided form as hydrated crystals. Although there is an excess of solid over the water necessary to form a solution of all of the salt at one time, the physical form of all the phosphate salt is altered.

Into the buffer slurry thus produced, the previously formed slurry of hydrotropic agent and Halane is introduced.

The surface-active agent and also the optical bleach, if any are to be used, are introduced and stirred into the whole.

The proportions of the buffer salt and of the said hydantoin are more than the saturation amounts, so that the resulting aqueous composition is really a slurry of the excess of undissolved or reprecipitated solids distributed between intimately blended water and organic phases. The total solids content is high, a suitable proportion being about 50–80 parts for 100 parts of the total wet composition.

The slurry so made is then atomized in spray drying equipment of conventional design, into a hot gas stream at a temperature above 212° F., as within the range 500°–750° F. initial temperature and an outlet temperature of 220°–350° F. for the gas stream from the drier. The gas temperature, size of atomized particles, and time of their contact with the gas are so controlled, in accordance with usual technique for establishing spray drying conditions, so that the dried particles of the slurry issue from the drier at a moisture content approximately within the range 8%–13%; the temperature of the particles during the period of drying is never above 212° F.; and the moisture content is at no time below about 8%. As a result, the phosphate, when used as the buffer salt, remains in hydrated condition and the available chlorine concentration is lowered by 5%–20% of the original.

The ingredients in the beads are intimately blended and co-solidified and the inorganic components space apart the particles of the hydantoin compound. These inorganic components, forming an alkaline barrier between the minute masses of the hydantoin compound, stabilize the latter against objectionable loss of chlorine in advance of use. The spacing material serves as a receptor for hydrogen chloride, hydrochloric or hypochlorus acid, or chlorine in aqueous dispersion.

I consider the greater effectiveness in bleaching in contact with water than that obtained with the dichlorodimethylhydantoin used alone, in amount to give the same proportion of available chlorine, to be due to the increase in solubility of the hydantoin caused by coaction of the components of my composition, the control of the pH, and the moderated liberation of available chlorine from the product by the spacing apart of the hydantoin compound.

It will be understood that the term "bleaching" is used herein to mean whitening as by removal of stain or discoloration of soiled fabric, not removal of the original color thereof.

The invention will be more fully illustrated in connection with the following specific examples of the practice of it.

*Example 1*

855 parts of a 35% solution of sodium toluene sulfonate in water was stirred in a crutcher equipped with slurrying baffles and an agitator with 729 parts of powdered commercial dichlorodimethylhydantoin of 66% available chlorine.

2388 parts of water at about 60° F. were stirred in a tank equipped with a jacket for cooling. To this water there was added slowly 2025 parts of substantially anhydrous tetrasodium pyrophosphate in the form of fine granules. As the pyrophosphate hydrated, there was a rise of temperature within the jacketed kettle to approximately 115° F. The product of the mixing was a phosphate buffer salt of satisfactory degree of hydration in the form of a somewhat thixotropic mass.

To the slurry of the buffer salt so prepared I added 1900 parts of anhydrous sodium sulfate builder salt with good agitation. A moderate temperature rise occurred as the sodium sulfate was added.

Into the mix so made I incorporated the surfactant in the form of 450 parts of a 38%–40% solution of sodium dodecylbenzene sulfonate in water.

To the fluid pourable mass that resulted, I then added 6.75 parts of the optical brightener or bleach Calcofluor 4B and 2.25 parts Hiltamine Arctic White N. After the brightener was stirred in, I then added 644 parts of additional sodium sulfate and stirred the whole to give a uniform, flowable mass that may be handled with ordinary factory pumps.

Into the said flowable mass was then introduced the solution first prepared of sodium toluene sulfonate, dichlorodimethylhydantoin, and water.

The whole slurry was pumped through a usual type of homogenizer for slurries and then, under a pressure of about 500 lbs. to the square inch, through a restricted orifice against the shearing action of a mechanical atomizer of conventional type. This atomizer delivered the finely dispersed particles into the hot gas of spray drying equipment of conventional design.

The inlet temperature of air to the spray drying chamber was about 550° F. and this high temperature caused a rapid crusting over of the particles, due to quick surface drying.

The outlet temperature of the gas from the spray drier was approximately 230° F. The particles being dried were themselves at all times below 212° F. and the moisture content of them never below 8%, as shown by observations on the particles as they issued from the drier, their temperature being higher and their moisture content lower at that time than at any other stage during the processing in the drier.

The composition was retained in the gas stream chamber of the drier in this example at such a temperature and for such a time that, after the particles had been freed of ambient gas of the spray drying equipment, their temperature was 120° F., approximately 9% of the original available chlorine had been removed during the processing described, and the moisture content of the issuing beads was 10%–12% in various parts of the product representing considerably more than a ton dry weight of material.

*Example 2*

The procedure and proportions of Example 1 are followed except that I substitute sodium tripolyphosphate, in equal proportion by weight, for the pyrophosphate of Example 1. The sodium tripolyphosphate used was a mixture of its phases I and II in the proportion of about 40 parts of I for 100 parts by weight of the total.

*Example 3*

The procedure of Example 1 is followed except that the 2025 parts of the pyrophosphate buffer salt used is replaced by an equal weight of mixed tetrasodium pyrophosphate and sodium tripolyphosphate, borox, or sodium or potassium carbonate or sesquicarbonate, either alone or mixed with each other or with the pyrophosphate.

*Example 4*

2023 parts of sodium tripolyphosphate were stirred into 2419 parts of water as described in Example 1. To the resulting slurry of transiently soluble tripolyphosphate in the aqueous solution of a part of the tripolyphosphate, I admixed 360 parts of sodium isopropylnaphthalene sulfonate (Aerosol OS), the sulfonate serving as the hydrotrope. After these materials were thoroughly mixed, I added 1900 parts of anhydrous sodium sulfate and, at the same time, 200 parts of a surface-active agent in the form of a 38%–40% solution of sodium dodecylbenzene sulfonate in water.

Next I introduced 8 parts of Calcofluor 5B, 541 of Halane (66% available chlorine), and 1000 of anhydrous sodium sulfate.

After 20 minutes of contact of the hydrotrope with he Halane, I added additional sodium dodecylbenzene ulfonate in the amount of 591 parts of the 30%–40% iqueous solution. Then I added 960 parts of additional inhydrous sodium sulfate and stirred the whole, to make flowable, relatively smooth slurry. The maximum temperature reached was 115° F.

The slurry was forced through an orifice, atomized, rocessed and dried as described in Example 1. The nlet temperature for the air stream was 500° F., the utlet temperature 275° F., and the pressure used to orce the slurry through the restricted orifice and against he shearing force of the atomizer parts was 1000 lbs. er square inch. It was found that 14% of the origial chlorine was removed and that the remaining moisure content of the spray dried composition was 8%–9%.

*Example 5*

The procedure of any of the Examples 1–4 is followed ith the substitution on an equal weight basis of any ne of the other hydrotropes named above, any one of e surfactants, any one of the optical bleaches, any one f the buffer salts, and any one of the builder salts or ixtures of these ingredients of the several classes for e representatives of the same classes, respectively, used n Examples 1–4.

*Example 6*

The procedure of any of the Examples 1–5 is followed ith the substitution of chlorinated dimethylhydantoin ade as described earlier herein on an equal weight basis or the dichloro compound.

The process described is simple, economical, and dependable. It gives a finished flowable and stabilized composition in the form of fine granules or beads of the desirable properties recited.

It will be understood that it is intended to cover all changes and modifications of the examples of the invention herein chosen for the purpose of illustration which do not constitute departures from the spirit and scope of the invention.

What I claim is:

1. In making a bleaching and sanitizing composition, the process which comprises making an aqueous slurry of 5–20 parts by weight of dichloro-di-lower-alkylhydantoin and 10–40 parts of an antacid buffer salt selected from the group consisting of sodium and potassium dihydrogen phosphates, tripolyphosphates, hexametaphosphates, pyrophosphates, tetraborates, and sesquicarbonates, dispersing the slurry in the form of fine particles into a hot stream of gas at a gas temperature above 212° F., so as to form a dried exterior of the atomized particles of slurry, maintaining contact of the said particles with the hot gas until they are dried and 5%–20% of the original available chlorine of the dichloro-di-lower-alkylhydantoin is removed, as shown by decreased ratio of chlorine to nitrogen content in the resulting partially dechlorinated residue, and then separating the particles from the stream of gas, the said particles being maintained at all times during the drying operation at a temperature below 212° F. and of water content not below about 8%.

2. The process of claim 1 in which the said dichloro-di-lower-alkylhydantoin is dichlorodimethylhydantoin, the said salt is a sodium polyphosphate, and the phosphate is introduced initially in proportion in excess of the amount soluble in the water present in the aqueous slurry.

3. A bleaching and sanitizing composition comprising about 5–20 parts by weight of partially dechlorinated dichloro-di-lower-alkylhydantoin containing 5%–20% less available chlorine than present in dichloro-di-lower-alkylhydantoin and 10–40 parts of an antacid buffer salt selected from the group consisting of sodium and potassium dihydrogen phosphates, tripolyphosphates, hexametaphosphates, pyrophosphates, tetraborates, and sesquicarbonates.

References Cited in the file of this patent

UNITED STATES PATENTS

| | | |
|---|---|---|
| 2,308,992 | Mertens | Jan. 19, 1943 |
| 2,430,233 | Magill | Nov. 4, 1947 |
| 2,422,255 | Peters | June 17, 1947 |
| 2,515,577 | Waldeck | July 18, 1950 |
| 2,578,270 | Strain | Dec. 11, 1951 |
| 2,607,738 | Hardy | Aug. 19, 1952 |
| 2,623,856 | Sanders | Dec. 30, 1952 |
| 2,702,296 | Sartori | Feb. 15, 1955 |

OTHER REFERENCES

Surface Active Agents, by Schwartz et al., p. 417, pub. by Interscience Publishers, Inc., N. Y. (1949).

Encyclopedia of Surface Active Agents, by Sisley et al., pp. 207, 208, 242, 283, 338, 362 and 531, pub. by Chemical Publishing Co., Inc., N. Y. (1952).